United States Patent [19]
Bergman et al.

[11] Patent Number: 5,859,505
[45] Date of Patent: Jan. 12, 1999

[54] METHOD AND CONTROLLER FOR OPERATING A HIGH PRESSURE GAS DISCHARGE LAMP AT HIGH FREQUENCIES TO AVOID ARC INSTABILITIES

[75] Inventors: Anthonie H. Bergman, Eindhoven, Netherlands; Phuong T. Huynh, McClear, Va.

[73] Assignee: Philips Electronics North America Corporation, New York, N.Y.

[21] Appl. No.: 942,947

[22] Filed: Oct. 2, 1997

[51] Int. Cl.$^6$ ........................................................ G05F 1/00
[52] U.S. Cl. .......................... 315/307; 315/308; 315/292; 315/291; 315/DIG. 7
[58] Field of Search ..................................... 315/308, 307, 315/291, 292, 224, 209 R, 105, DIG. 5, DIG. 7

[56] References Cited

U.S. PATENT DOCUMENTS

| | | | |
|---|---|---|---|
| 5,225,742 | 7/1993 | Beasley | 315/307 |
| 5,235,255 | 8/1993 | Blom | 315/224 |
| 5,481,162 | 1/1996 | Boenigk et al. | 315/307 |
| 5,485,061 | 1/1996 | Ukita et al. | 315/307 |
| 5,569,984 | 10/1996 | Hotslag | 315/307 |
| 5,623,187 | 4/1997 | Caldeira et al. | 315/307 |

FOREIGN PATENT DOCUMENTS

| | | |
|---|---|---|
| 0708579A1 | 4/1996 | European Pat. Off. . |
| 4277495A | 10/1992 | Japan . |
| 4294095A | 10/1992 | Japan . |

OTHER PUBLICATIONS

"An Autotracking System for Stable Hf Operation of HID Lamps", F. Bernitz, Symp. Light Sources, Karlsrihe, 1986.
"Acoustic Resonances in Cylindrical High–Pressure Arc Discharges", by H.L. Witting, J. Appl. Phys. 49(5), May 1978, pp. 2680–2683.
Journal of the Ulluminating Engineering Society, Summer, 1991, pp. 95–96.

"High Frequency Operation of Metal–Halide Lamp Controlled by Microcomputer", by T. Mizuno et al, pp. 26–30.

"Acoustic Resonance Phenomena in Low Wattage Metal Halide Lamps", by J.M. Davenport et al, Journal of IES, Apr. 1985, pp. 633–641.

"Study of HID Lamps With Reduced Acoustic Resonances", by S. Wade et al, Journal of the Illuminating Engineering Society, Winter, 1987, pp. 166–174.

"Acoustic Resonances in High Frequency Operated Low Wattage Metal Halide Lamps", by J.W. Denneman, Philips Journal of Research, vol. 38, Nos. 4/5, 1983, pp. 263–272.

*Primary Examiner*—Don Wong
*Assistant Examiner*—Haissa Philogene
*Attorney, Agent, or Firm*—Brian J. Wieghaus

[57] ABSTRACT

A variable duration method for controlling a high pressure gas discharge lamp to avoid arc instabilities caused, for example, by acoustic resonance. The method controls the lamp at different operating frequencies so that it stays longer at frequencies which are stable while only staying for very short times at frequencies where the arc is unstable. The method and apparatus operate the lamp at a plurality of operating frequencies and determine a stability factor for each frequency by recurrently sampling an electrical lamp parameter during operation at each frequency. The stability factor corresponds inversely to a deviation in the sensed electrical parameter, so that frequencies with little arc instability have a high stability factor and are selected more frequently for operating the lamp than are frequencies having arc instabilities, which will have low stability factors.

41 Claims, 6 Drawing Sheets

METHOD AND CONTROLLER FOR OPERATING A HIGH PRESSURE GAS DISCHARGE LAMP AT HIGH FREQUENCIES TO AVOID ARC INSTABILITIES

BACKGROUND OF THE INVENTION

CROSS-REFERENCE TO RELATED APPLICATIONS

This application relates to U.S. application Ser. No. 08/942,893 filed concurrently herewith, of Antoine H. Bergman and Phuong T. Huynh, entitled "Method of Sampling An Electrical Lamp Parameter to Detect Arc Instabilities", which discloses and claims a method and circuit for detecting an electrical lamp parameter.

FIELD OF THE INVENTION

The invention relates to a method of operating a high pressure gas discharge lamp at high frequencies, and in particular, to detecting arc instabilities induced by acoustic resonances and to selecting operating frequencies to avoid visible flicker during lamp operation. The invention also relates to a lamp controller for controlling lamp operation according to this method.

DESCRIPTION OF THE PRIOR ART

High pressure discharge (HID) lamps, such as mercury vapor, metal halide and high pressure sodium lamps, are typically operated with a magnetic ballast at or slightly above normal power line frequencies, e.g. 60–100 Hz. It would be desirable to provide an electronic ballast which operates HID lamps at high frequencies at above about 20 kHz. High frequency ballasts are becoming increasingly popular for low pressure mercury vapor fluorescent lamps. The high frequency operation permits the magnetic elements of the ballast to be reduced greatly in size and weight as compared to a conventional low frequency magnetic ballast.

A major obstacle to the use of high frequency electronic ballasts for HID lamps, however, is the acoustic resonances/arc instabilities which can occur at high frequency operation. Acoustic resonances, at the minimum, cause flicker of the arc which is very annoying to humans. In the worst case, acoustic resonance can cause the discharge arc to extinguish, or even worse, stay permanently deflected against and damage the wall of the discharge vessel, which will cause the discharge vessel to rupture.

The article "An Autotracking System for Stable Hf Operation of HID Lamps", F. Bernitz, Symp. Light Sources, Karlsruhe 1986, discloses a controller which continuously varies the lamp operating frequency about a center frequency over a sweep range. The sweep frequency is the frequency at which the operating frequency is repeated through the sweep range. The controller senses lamp voltage to evaluate arc instabilities. A control signal is derived from the sensed lamp voltage to vary the sweep frequency between 100 Hz and some Khz to achieve stable operation. However, this system has never been commercialized.

Accordingly, it is an object of the invention to provide a method of detecting arc instabilities in gas discharge lamps, which is widely applicable of lamps of different power, type, dimension, or physical or chemical composition. It is another object to provide such a method which may be implemented in a wide range of ballast topologies.

It is yet another object to provide a method of operating HID lamps at high frequencies to detect and avoid frequencies at which acoustic resonance occurs for a broad range of lamps, or at least lamps of the same discharge vessel construction from different lamp manufacturers.

It is still another object to provide a lamp controller, or ballast, which implements this method.

SUMMARY OF THE INVENTION

The method according to the invention includes operating the gas discharge lamp at a plurality of operating frequencies. A stability factor is determined for each operating frequency, which stability factor is used to choose subsequent operating frequencies from the plurality of operating frequencies based on preselected criteria for the stability factor. The stability factor is determined by recurrently acquiring a plurality of samples of an electrical lamp parameter and calculating a deviation of the samples taken during each acquisition. The deviations from each acquisition are summed and the number of iterations of the acquiring step are counted until the sum of deviations exceeds a first target value. The stability factor for the present operating frequency is assigned an updated value equal to this number of iterations, and a new operating frequency is chosen based on the selection criteria for the stability factor. Preferably, the subsequent operating frequency is the frequency having the highest stability factor.

A lamp controlled according to the above variable duration method stays longer at operating frequencies which provide a stable arc than at frequencies which cause an unstable arc. For a stable arc, the deviations in the electrical lamp parameter sampled during each acquisition step will be small. Conversely, for an unstable arc, the deviations will be large. For a given first target value, the method will go through more acquisition steps (and therefor have a higher stability value) before the sum of the deviations exceeds the first target value, than an unstable arc. When a frequency becomes unstable, its stability factor will be updated to a low value and will generally not be selected again. The first target value is selected so that, at the minimum, the lamp will only stay at operating frequencies which yield an unstable arc a sufficiently short time so as not to cause damage to the discharge vessel, and favorably, so as to avoid visible flicker.

In favorable embodiment, the lamp is operated at a preselected number of frequencies within a region which is generally known to be stable. These frequencies are assigned a stability factor prior to lamp ignition indicative of how stable the lamp is for each frequency.

According to another embodiment, the first target value is modified in dependence on the phase of operation of the discharge lamp. High pressure gas discharge lamps have a run-up phase, during which the operating temperature and pressure increase, and a steady-state phase, wherein the operating temperature and pressure vary to a much smaller degree. The frequencies at which arc instabilities occur change rapidly within the run-up phase and also are different from the steady-state phase. The lamp is generally less stable during run-up, with instabilities occurring across a broad range of frequencies, which will tend to drive the stability factors to low values. To avoid a loss of selectivity during run-up, the stability factor should be higher during this phase, but be lower during steady-state. This may be accomplished in a pre-programmed gradual manner or adaptively, both techniques to be described in greater detail hereinafter.

When a lamp is operated for an extended period or goes through an unstable period, the stability factors for all but the driving frequency may be low. This means that it is unlikely for any but the driving frequency to be selected. If the operating conditions were to change, it would be desirable to have the possibility for at least several other frequencies to be selected. This is accomplished by ensuring that the stability factor is sufficiently high for at least several frequencies. In one embodiment, an average value of the stability factors is calculated and, if this average value falls below a preselected level, the stability factor for each frequency is increased by a predetermined amount. In another embodiment, a preselected minimum difference is maintained between the highest value and the next highest value for the stability factors.

The deviation calculated from the samples during each acquisition may be the standard deviation. Alternatively, to simplify calculations in a microprocessor, the deviation is the maximum deviation calculated by subtracting the smallest sample value from the largest sample value during the sample acquisition step. This avoids floating point divisions necessary for calculating the standard deviation.

The lamp parameter sampled may be the lamp conductivity. Alternatively, the sampled lamp parameter may be the lamp voltage. In favorable embodiment, the sampled lamp parameter is a quasi-RMS lamp voltage obtained by rectifying and filtering the lamp voltage.

The invention also concerns a lamp controller which drives a gas discharge lamp according to the above method.

These and other object, features and advantages of the invention will become apparent with reference to the following detailed description and the drawings, which are illustrative only and not limiting.

BRIEF DESCRIPTION OF THE DRAWINGS

FIG. 2($b$) is a graph of relative standard deviation of conductivity vs. frequency for a 35 W PCA lamp;

DETAILED DESCRIPTION OF THE PREFERRED EMBODIMENTS

Figure 1:
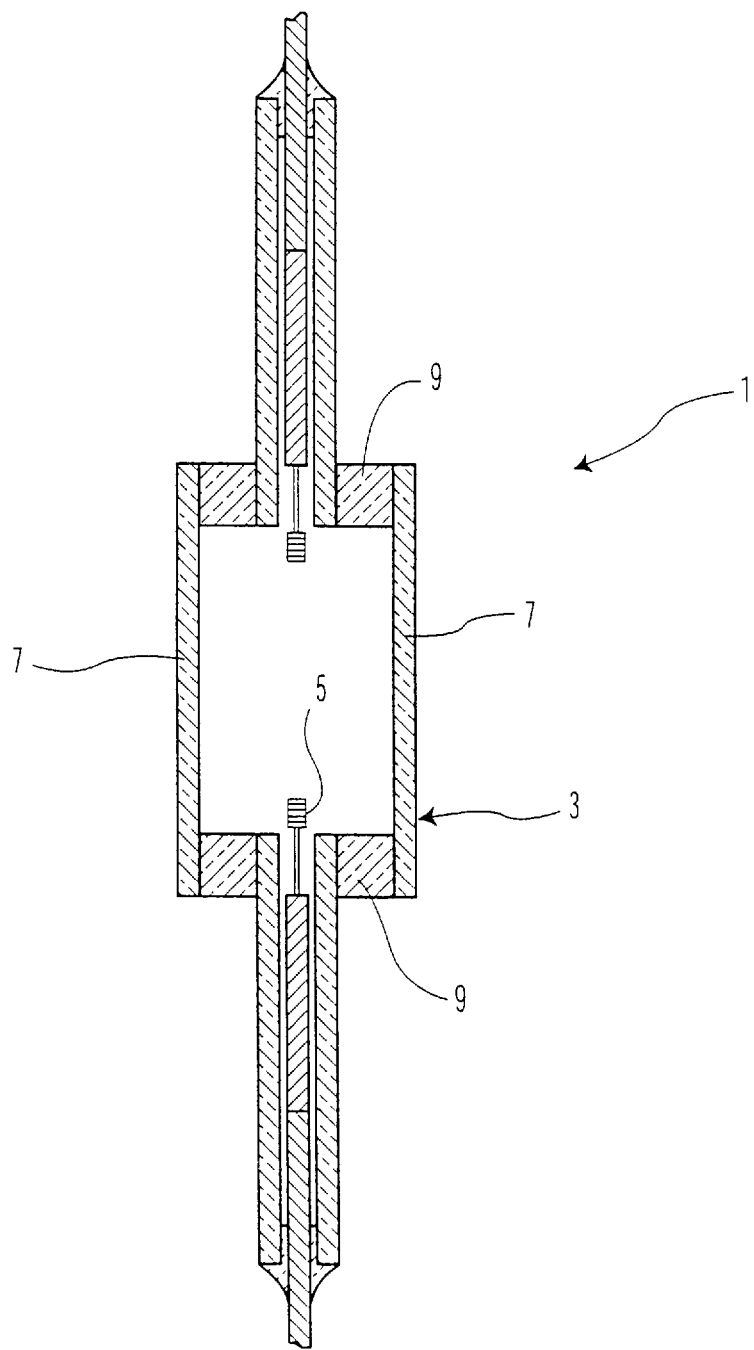
FIG. 1 is a cross-section of a low wattage, high pressure discharge vessel having a cylindrical PCA discharge vessel.

FIG. 1 shows a discharge vessel for a low wattage, for example 35 W, metal halide lamp having an arc tube 1 of polycrystalline alumina ("PCA"). The main body 3 of the arc tube is circular cylindrical and has electrodes 5 extending therein between which a gas discharge is maintained during lamp operation. It is noted that such a discharge vessel differs from the conventional arc tubes of quartz glass used for higher wattage metal halide lamps. An advantage of PCA arc tubes is that tight dimensional tolerances can be maintained, which is critical for low wattage lamps. The PCA arc tube has straight cylindrical walls 7 terminating at end plugs 9 and having sharp, well defined internal corners. This is different than arc tubes of quartz glass, which have well rounded ends.

These geometrical differences cause significant differences in the behavior of the discharge arc. For a general discussion of acoustic resonances in gas discharge lamps, reference is made to U.S. Pat. No. 5,569,984 (Holstlag et al) (herein incorporated by reference). The acoustic resonances in PCA tends to be stronger and have more abrupt onsets. This is plausible because in the irregularly shaped quartz burner more resonances (or combinations of radial and azimuthal resonances) are possible, while in the almost perfect cylinder of PCA the resonances are better defined. However, although the PCA cylinder is more perfect, the inside is not homogeneous because of the temperature profile in the fill gas and the related speed-of-sound profile. This relaxes the constraint put on the resonant frequencies due to the symmetrical property of the PCA cylinder. As known from the referenced Holtslag patent, standard deviation of conductivity $\sigma(G)$ is a good measurement of the arc stability and is useful to investigate acoustic resonances.

Figure 2A:
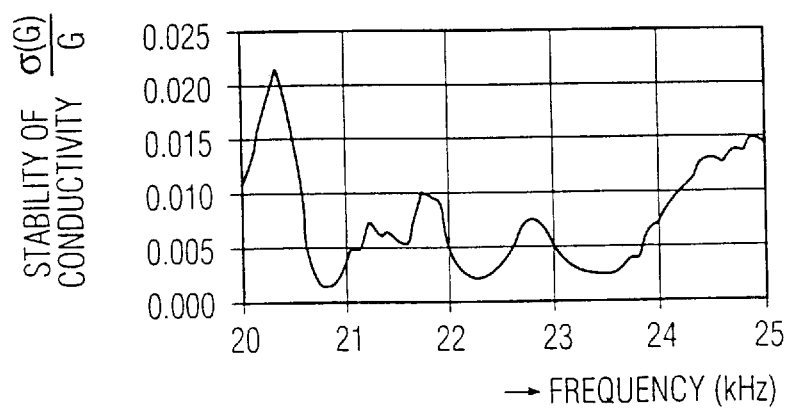
FIG. 2($a$) is a graph of relative standard deviation of conductivity vs. frequency for a 100 W quartz lamp.
Figure 2B:
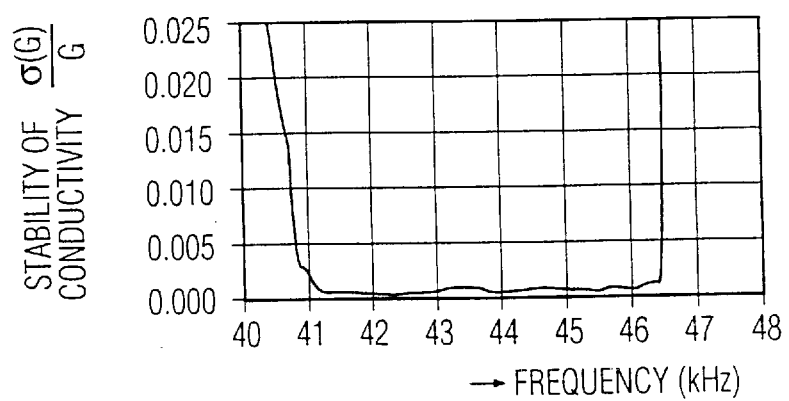

FIG. 2($a$) illustrates the relative conductivity $\sigma(G)/G$ vs. frequency for a 100 W metal lamp with a quartz arc tube while FIG. 2($b$) is for a 35 W metal halide lamp with a PCA arc tube. Each graph represents a frequency window within which operation is considered to be relatively safe, i.e., free of strong resonances. These two Figures illustrate two important differences between these types of lamps. First, as mentioned earlier, the resonances for the quartz burner are broad and not very strong, while the resonances for the PCA lamp are narrow and strong. The resonance around 47 kHz (current frequency) for this particular PCA lamp were found to be occasionally strong enough to extinguish the lamp. Second, the PCA lamp tends to be extremely stable over a broad frequency (41–46 kHz) range, whereas the quartz lamp is stable in relatively small regions (around 20.8, 22.2 and 23.5 kHz). Note that a lamp is without visible flicker when $\sigma(G)/G$ is below 0.005, as known from the aforementioned Holtslag patent.

Several known methods, including that described in the Bernitz article and that described in the Holtslag patent, employ broad frequency scans of one form or another, either continuously or to test where resonances occur. For lamps in which resonances are narrow and strong, as in the PCA lamp, it was found that such broad scans can be troublesome, since when such a strong resonance is approached during scanning, searched and subsequently gone back through, the strong resonance is excited, frequently causing the lamp to extinguish. An advantage of the PCA lamp, however, is that it is stable over a considerable frequency range, although this range will shift both during operation and as the lamp ages. Within this considerable range every frequency seems to be acceptable.

Figure 3:
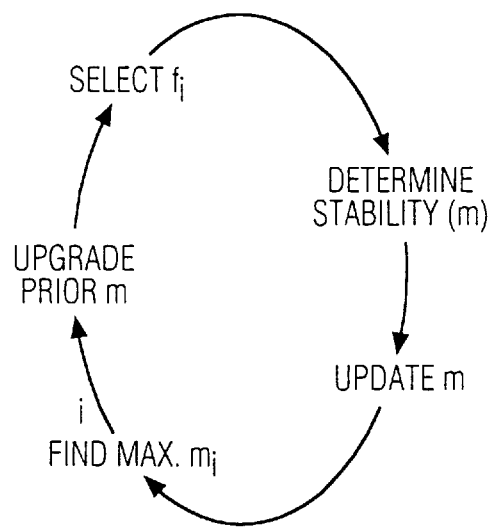
FIG. 3 diagrammatically illustrates the basic steps of method according to the invention.

FIG. 3 illustrates the basic method according to the invention. Generally speaking, the method operates the lamp at a pre-selected set of frequencies, determines and updates a stability factor for each frequency, and operates the lamp at the frequency having the highest stability factor. To begin the algorithm, a set of possible operating frequencies $f_i$ (i=1–n) are selected within a frequency window known to be generally safe. Each of these frequencies is assigned an initial stability factor $m_i$, and at least one of the frequencies has a highest stability factor to ensure the lamp begins operation at this frequency. Thus, at the outset we have an array of frequencies and corresponding stability factors($f_i$, $m_i$) (i=1–n).

This loop can be run right from the start during run-up. It is not necessary for the lamp to be warm and stabilized. The algorithm will adapt to changing situations during run-up and steady-state, as will be evident from the following discussion.

Figure 4:
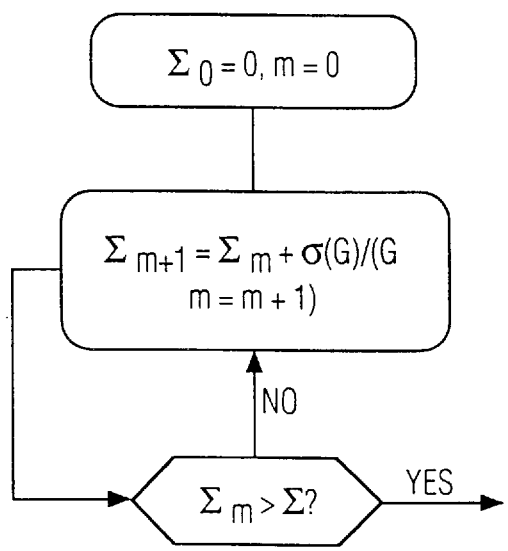
FIG. 4 is a flow diagram for determining the stability value m for an operating frequency.

The lamp is ignited and initially operated at the frequency having the highest assigned stability factor. A set of measurements of an electrical lamp parameter, such as the lamp voltage and/or current, are sampled. For the purposes of discussion, we will assume voltage and current are sampled, which provides the conductivity G=I/V. This gives a set of conductivity samples G, from which a value for $\sigma(G)/G$ is calculated (relative standard deviation of the conductivity). This procedure of sampling and calculating the relative deviation is designated as one "acquisition" (1 acq.). This $\sigma(G)/G$ value is compared with a first target value, hereinafter designated "$\Sigma$". If the value of $\sigma(G)/G$ is smaller than $\Sigma$, another acquisition is done and its $\sigma(G)/G$ value is added to the previous value. This sum is compared again to the first target value $\Sigma$, and further acquisitions are made until the running sum of the relative standard deviation, $\sigma(G)/G$, for the acquisitions exceeds $\Sigma$. The number of acquisitions taken until the value of the first target $\Sigma$ is exceeded, is stored. This number of acquisitions is the updated stability factor $m_i$ for that frequency $f_i$. This small loop is depicted in FIG. 4.

Every time the first target value $\Sigma$ is reached or exceeded a new frequency $f_i$ is selected and a loop as described is performed. This will give a new number of acquisitions (#acq.) associated with the selected frequency, which becomes the updated stability factor m for this new frequency. Consequently we get a set (or array) of frequencies ($f_1$–$m_1$, $f_2$–$M_2$. . . $f_n$–$m_n$) with associated values for the stability factor which are updated when that frequency is selected.

After a stability value $m_i$ is updated, the array of values $m_i$ is examined according to preselected criteria, such as the maximum m value. For equal values of the stability factors $m_i$ one option is to select the first one occurring in the array. However, if the values are equal, a random selection is preferable to prevent a preference for the first frequencies in the array. The respective frequency for this maximum value of the stability factor is then selected as the next driving frequency and the loop is closed. The newly selected frequency may very well be the same frequency again and probably will be for a stable frequency.

Figure 5:
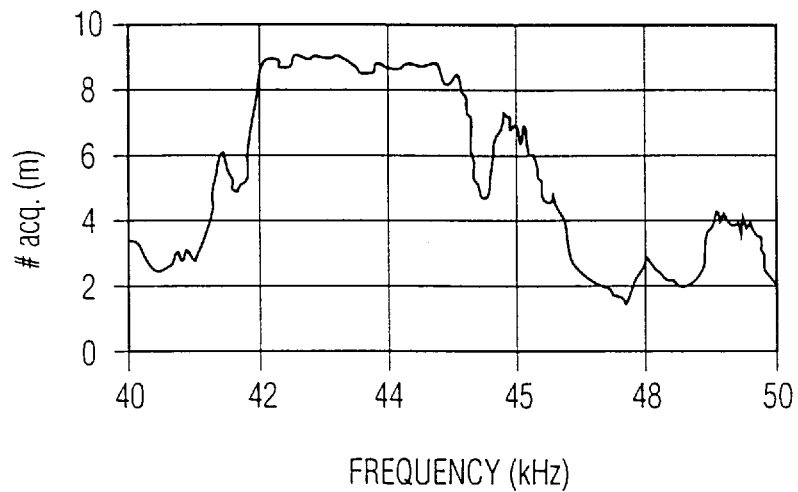
FIG. 5 is a graph illustrating arc stability and showing the stability factor as a function of the operating frequency.

The first target value $\Sigma$ is normally chosen such that a stable arc will yield a value for the stability factor which affords selectivity, for example, of m≈7. An unstable arc must yield m=1 or 2 to keep the time spent at that particular frequency short, so as to avoid flicker. FIG. 5 gives a typical result using this method to measure arc stability. It is essentially inverted relative to FIG. 2(b) because low values of $\sigma(G)/G$ yield high values for m. The observing reader will notice that the m values in FIG. 5 are not integers. All measured values were integers but the graph is smoothed by averaging neighbors.

Upgrading the m Values

It should be noted that from the onset of the algorithm the values of $m_i$, as a group, can only decrease. When a frequency is selected, it has the maximum value in the array (that is why it was chosen in the first place). When the m value of the driving frequency is largest it will be selected again. The frequency is only changed when its stability factor is no longer the highest. After a new frequency is chosen the m value associated with the old frequency will be lower than its previous value. If all values reach the same minimum, and if the algorithm for finding the maximum favors the first occurring frequency in the array encountered from a set of same values, only this first frequency will be selected from this point onward. Accordingly, it is beneficial to have the frequency selected randomly whenever the values $m_i$ in the array are the same.

Additionally, when a frequency $f_i$ for a certain time period is unstable and yields an $m_i$ value of 1 it will never be selected again (or the frequency has to be first occurring in the array row, with all values equal to 1). Obtaining a value of 1 is good when the frequency is associated with an acoustic resonance, but when the value is 1 because of a sodium flare or an arc jump at an otherwise stable frequency, this is undesirable since these are generally random occurrences and not frequency dependent. Therefore a further procedure to upgrade the m values is desirable.

An easily implemented technique to upgrade the m values is to just add an integer constant, for instance, "2" to the last measured value. This should be done after the maximum value is determined in the loop. Otherwise the last selected frequency is over preferred. When a frequency is selected after the upgrade of its m value, the m value will be measured again and this value will replace the upgraded value. This means that the influence of this upgrade is not cumulative. Again, upgrading prevents an m value from remaining at very low values. If an m value became "1" it would be virtually impossible for this frequency to be selected again. With an upgrade equal to "2", the minimum value is "3". With a value of "3" it is unlikely that the frequency will be selected, but not impossible. This is especially true when the frequency is near the beginning of the array, assuming a maximum-search algorithm that favors the first encountered value. For this reason the frequencies and the order in which the frequencies are placed should be done wisely.

A more sophisticated method of upgrading is to only add to the old value if the values stay below a certain level or, even better, use a look-up table, which upgrades selectively, for example.

Still another option is to maintain a preselected minimum value between the highest and second highest $m_i$ values in the array by adding a constant to one or more of the m values in the array. This is accomplished by determining the two highest m values, determining the difference between them and comparing the difference with the desired difference. If the difference is different than the desired difference, a value is added or subtracted as illustrated in the following examples.

| example 1 wanted distance = 3 | | example 2 wanted distance = 2 | | example 3 wanted distance = 3 | |
|---|---|---|---|---|---|
| m values | new m's | m values | new m's | m values | new m's |
| 8 | 8 | 8 | 8 | 8 | 8 |
| 6 | 5 | 8 | 6 | 2 | 4 |
| 3 | 2 | 6 | 4 | 3 | 5 |

-continued

| example 1 wanted distance = 3 | | example 2 wanted distance = 2 | | example 3 wanted distance = 3 | |
|---|---|---|---|---|---|
| m values | new m's | m values | new m's | m values | new m's |
| 5 | 4 | 2 | 0 | 1 | 3 |
| 2 | 1 | 5 | 3 | 2 | 4 |

This technique will increase the low values only when needed.

There is always a frequency close by, waiting to take over at the slightest arc movement.

This technique prevents reoccurring switching between to equally stable frequencies (induced by noise). An example of this is given in the table as example 2.

The technique automatically upgrade all m's when the average falls too low. An example is given in the table as example 3.

Adding a constant avoids multiplication/division in the microprocessor.

Changing The First Target Value

Lamp stability is different during run-up and steady-state. During run-up the temperature of the burner is increasing and so is the gas temperature and pressure. This changes the velocity of sound waves and therefore the resonance frequencies. Because the proposed algorithm will adjust the frequency (when necessary), it can cope with this changing environment. However, a another refinement is favorable. Since the lamp is less stable during run-up, the m values in the array will generally become low during this phase. The values can get so low that the algorithm loses selectivity; that is, only m values of "1", "2" & "3" occur, which means that many frequencies will have the same m value, making it difficult to select a stable frequency. To circumvent this loss of selectivity, one solution is to have a larger value for the first stability factor $\Sigma$ during run-up than during steady-state. Whether the lamp is in the run-up or steady-state can be determined by the value of the lamp-voltage. Typical rms voltage during steady-state for a metal halide lamp is about 90 V while shortly after ignition the lamp voltage is as low as 20 V. This may be implemented, for example, in a stepped fashion, with the following values:

For V <60 V (considered run-up) $\Sigma$ is set equal to 0.02

For V $\geq$60 V (steady-state) $\Sigma$ is set equal to 0.01

However, when value of the first target $\Sigma$ is changed in such an abrupt fashion, the basic algorithm tends to select most of frequencies in the array in a short time, which can cause flicker. Accordingly, the value for $\Sigma$ should be decreased in a gradual manner as the lamp transitions from the run-up to the steady-state phase.

Another favorable technique is to adaptively change the first target value $\Sigma$ when the value for a stability factor $m_i$ becomes too low or too high. This can be done by setting a second target value to which the updated stability factor $m_i$ is compared. For example, set a second target value for 7 acquisitions. When an updated factor $m_i$=5, the old first target value $\Sigma$ will be increased by multiplying by a number greater than one. When an updated stability factor m is greater than the second target value (ex. m=8), $\Sigma$ will be multiplied by a number less than one. A look-up table for the multiplication-factor can be utilized within the controller. This also has the advantage that the division of the wanted value and the actual value, to get the multiplication factor, is not necessary. This is especially advantageous for a simple microprocessor.

A first target value $\Sigma$ adapted in this way will automatically deal with run-up and also with less-stable lamps, such as lamps nearing their end of life. However, care must be taken with this adaptive technique because when a frequency associated with a resonance is selected the #acq. approaches "1" and the new adapted first target value $\Sigma$ becomes very high, in this example 7 times the old $\Sigma$. If the newly selected frequency is also unstable, the high value of $\Sigma$ may cause this unstable frequency to be selected too many times, as the stability factor $m_i$ for this unstable frequency will remain artificially high despite high deviations. Therefore, the first target value $\Sigma$ should be limited to a $\Sigma_{max}$ (for example, =0.05). A good look-up table will make this less necessary. If the multiplication factor is chosen very moderately, the algorithm will not over react. It might take several loops to adapt, but that is acceptable.

Minimum Average Value for M

When a lamp is on for a very long time or has suffered from a long unstable period (sometimes during run-up), all of the values for the stability factors $m_i$ in the array might be low. This means that all frequencies except the driving one are unlikely to be selected. In order to reintroduce these frequencies, an additional technique may be used in which the average value of the stability factors $m_i$ in the array is checked and all values mare increased by an integer, such as (1) one, if this average value drops below a certain threshold (for example, 3.5). In this way more frequencies again become part of the selection. Unstable frequencies will be set back, once they are selected, to lower values automatically.

Sampling of the Electrical Lamp Parameter

As used herein, a sampled "electrical lamp parameter" is a lamp parameter capable of being fed back and sensed. This includes lamp conductance, impedance, voltage and current, as well as signals indirectly obtained from sensing an output of the lamp, such as an optical sensor sensing changes in the light output of the lamp and producing a signal indicative of changes in the light output. While indirectly obtained signals may be used, it will generally be more cost efficient in terms of a lamp ballast/controller implementation to directly sense voltage and/or current of the discharge lamp.

Selected Deviation; Sampling; Calculations

During the step of sampling and determining a deviation, a large plurality of samples are taken, for example 400, of the selected electrical lamp parameter. One option is to break the samples down into a plurality of groups of, for example, 50 samples each. Then within each group determine the standard deviation and from the standard deviation of all groups of the larger sample, determine a relative standard deviation. However, this typically requires multiplication as well as storing of data, which tends towards greater computation time as well as a more expensive micro controller. An alternative to using the standard deviation is to use within each group the maximum deviation, which is simply the difference between the largest and smallest sample in the group. This avoids multiplication within each group, and uses a simple subtraction which is a much easier operation for the micro controller.

A further technique is to use gliding sampling. Sampling in general is a tradeoff between sampling at a high sampling rate with many points or with a lower sampling rate with fewer points, the sampling speed being determined by the capabilities of a given micro controller. If the sampling rate is too fast, the maximum difference or the standard deviation will be small. This implies that the arc motion may not be detected readily because the deviations within each group are small. If the sampling rate is too slow, the difference will be large, but it will take a relatively long time for a group size of a given samples, since the sampling rate is low. Thus, even though the detected deviations are large and easy to detect, the detection may take too long and the lamp can extinguish or be damaged due to the arc remaining against the discharge vessel wall for too long. However, the latter problem can be avoided by using gliding sampling at a slow rate. With gliding sampling, after a first group is sampled, the next calculation of the maximum deviation or standard deviation uses at least some data from the previous group. Thus, the next group is incremented by a selected number of new samples from the preceding group, and uses samples from the preceding group. For example, for a group size of fifty, the next group could use one new sample and forty nine samples from the previous group, or three new samples and forty seven samples from the previous group. The consequence is that gliding sampling will show the same large difference as with a similar slow sampling rate, but the time it takes to find it is much shorter.

Lamp Conductivity

The previously mentioned U.S. '984 Patent (Holstlag '984) discloses a lamp controller suited to implement the above described method, which lamp controller is herein incorporated by reference. With reference to FIG. 13 of the '984 patent, the lamp controller includes a DC source 10, a boost converter 20 (also generally known as a preconditioner), a high frequency DC-AC square wave inverter 30 and an ignitor 40. A controller C includes a microprocessor 100 which is programmable with software to control the operation of the inverter 30, sense a lamp parameter and adjust the operating frequency to avoid acoustic resonance.

The referenced Holstlag patent also discloses circuitry (see FIGS. 14–17) for sensing the lamp voltage and current to sample the lamp conductivity, which circuitry may be used to input the lamp conductance as the sampled lamp parameter to microprocessor 100. For the conductivity measurement it is essential to sample both voltage and current and to do this simultaneously. This requires two analog-to-digital converters, which have relatively high cost.

Lamp Voltage

The lamp voltage or current alone may be sampled, which are also both effected by arc motion. The drawback of using current alone will be discussed later in this specification. However, in order to get a standard deviation comparable to σ(G), the voltage data has to be sampled carefully, since the voltage data has a lower signal-to-noise ratio than the conductivity. The voltage sampling needs to be triggered so that it occurs at the same point in the period of the lamp voltage signal, otherwise the sinewave shape of the lamp voltage signal will make the signal look unstable no matter what the lamp situation is. Triggering can be done relatively easily, as the trigger signal is already available in the form of the drive signal for the switches of the DC-AC inverter 30 in the ballast. Secondly good timing can make the signal-to-noise ratio much better. Actually, what is important is the information-to-noise ratio. The best place to take a sample is the phase of the waveform where the biggest deviation occurs when the arc begins to move.

Figure 6:
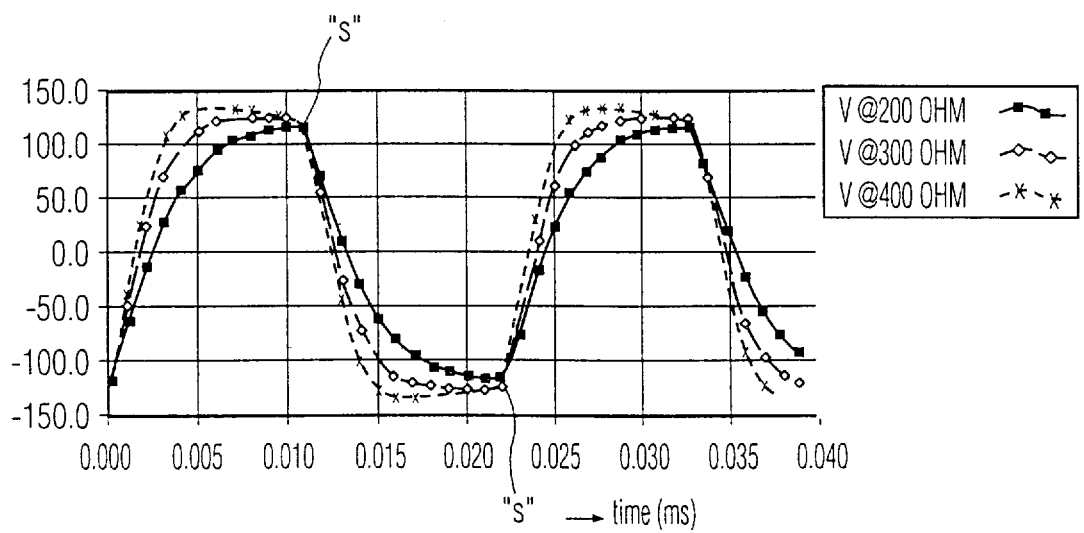
FIG. 6 is a graph illustrating the change in lamp voltage due to changes in resistivity, such as would occur with arc instability.

When the arc moves the lamp resistivity increases. To determine the best phase of the voltage waveform to get the best information-to-noise ratio, a measurement was done using simple resistors as a first order approximation of an arc motion. With a half bridge and an LCC ignitor, three waveforms were taken using respectively 200, 300 and 400 Ω resistors. These waveforms are shown in FIG. 6. The moments that the inverters' switches switch are labeled "S". Clearly, the best moment to sample does not coincide with the moment the switches switch, as the voltage for all three curves is substantially the same at that point (e.g., at 11 μs). Therefore a delay time with respect to the switching point of the switches is necessary. Without more, a fixed delay time is not suitable, since during lamp operation, the lamp operating frequency will change to avoid arc instabilities, such as caused by acoustic resonance. In order to sample at the same phase for each frequency the delay time becomes a function of frequency. However, having a delay time which varies with frequency would require additional circuitry and/or software and/or a more expensive microcontroller, and generally implies a higher cost ballast.

Quasi-RMS Voltage

In order to circumvent the necessity for a sampling technique which is frequency dependent, a more favorable technique according to the invention is to convert the lamp voltage to a 'quasi RMS' voltage. The lamp voltage amplitude is first lowered using a simple resistive voltage divider. Subsequently this low voltage is rectified and filtered, to give the 'quasi RMS voltage'. The choice of the cut-off frequency for the filter is very important. Generally, the cut-off frequency of the filter is related to the response time necessary to detect and react to arc motions to prevent the lamp from extinguishing. The cut-off frequency must be low enough so that the high frequency signals (35 to 40 khz) at which the inverter drives the lamp is sufficiently attenuated to allow accurate detection of arc motions from the sampled lamp voltage signal. The cut-off frequency may not be too low otherwise lamp changes will be detected too slowly. On the other hand, if the frequency is too high the signal does not get filtered. Cut-off frequencies of 2 kHz and 5 kHz have been found to be acceptable for a 39 W CDM lamp.

Figure 7A:
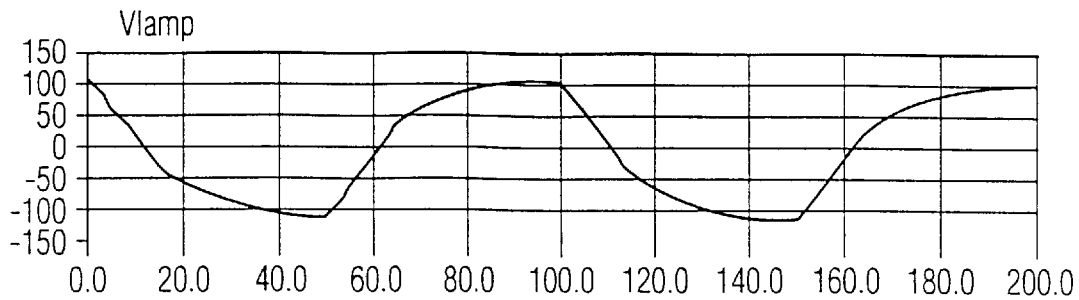
FIG. 7($a$) is a graph showing lamp volt g and FIG. 7($b$) is a graph of the quasi-RMS voltage.
Figure 7B:
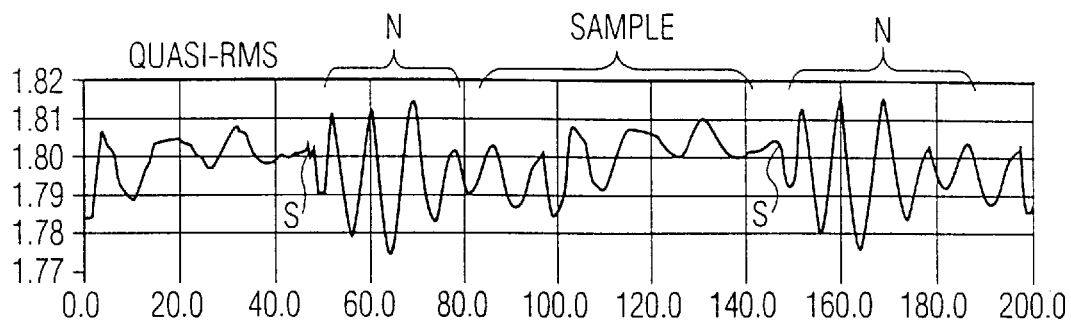

FIG. 7(a) is a graph of lamp voltage ($V_{LAMP}$) for a 39 W CDM (ceramic discharge vessel) lamp while FIG. 7(b) shows the corresponding quasi-RMS voltage $V_{quasi-RMS}$. In FIG. 7(b), the switching points are labeled "S". FIG. 7(b) shows that in the vicinity of these switching points, the quasi-RMS voltage has a region of spurious noise, labeled "N", caused by the switching of the inverter switches. In these regions "N", it would not be favorable to sample in order to obtain a high information-to-noise ratio. However, between these regions of spurious noise are relatively noise-free zones, labeled "sample", in which samples with a relatively high information-to-noise ratio may be obtained. Note that the excursions in the "sample" zones are small, in view of the much reduced voltage scale of FIG. 7(b) as compared to FIG. 7(a).

Because of the relatively wide "sample" zone in the quasi RMS voltage, samples may be taken anywhere in this zone. This gives considerable tolerance to the triggering of the sample. Thus, a fixed delay time may be used to trigger the sampling of the quasi-RMS voltage by the microprocessor and, despite reasonable changes in the operating frequency to avoid acoustic resonance, the sample will still occur within the relatively wide "sample" zone. Thus, fixed-time triggering can be used, which simplifies signal processing, allowing a lower cost microprocessor. This is in contrast to the case where lamp voltage is sampled directly, which requires a delay time that varies with frequency.

Figure 9:
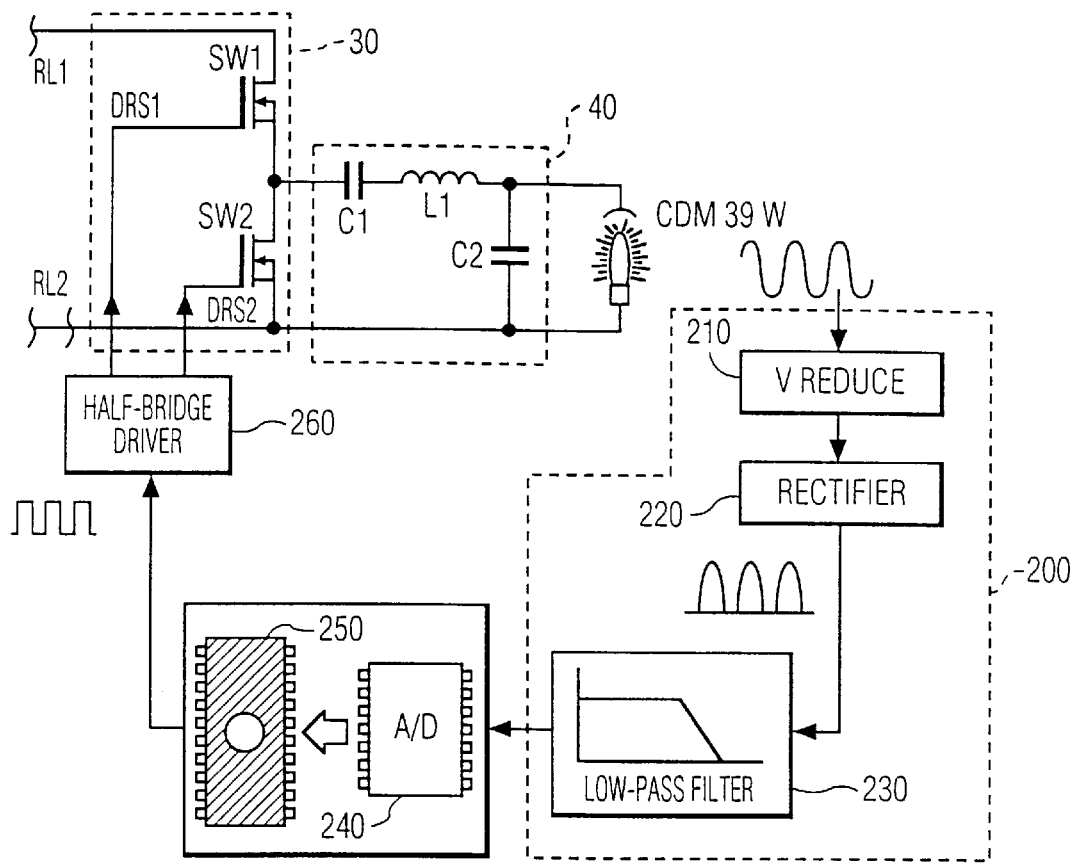
FIG. 9 is a block diagram of a circuit for sensing the quasi-RMS voltage and controlling the DC-AC converter.

FIG. 9 schematically illustrates the sensing of a quasi-RMS lamp voltage in a ballast for determining arc instabilities. For purposes of clarity, the front end of the ballast is not shown, but is understood to include a DC source for converting AC power line to 120 Hz DC and a preconditioner (also known as an upconverter) for supplying a DC voltage to the DC-AC inverter 30, as illustrated for example in the '984 Holstlag patent. In FIG. 9, the ignitor 40 is an LCC ignitor formed by capacitors C6, C7 and inductor L2. The DC-AC inverter includes switches Q1, Q2 driven by drive signals DRS1, DRS2 at the control gates of switches Q1, Q2. As further illustrated, the sinusoidal lamp voltage across the lamp is sensed and reduced in amplitude. (block 210), half-bridge rectified (block 220) and filtered (block 230) with a low pass filter, all in block 200. The output of the low pass filter 230 is the quasi-RMS voltage, which is input to an A/D converter 240 which converts the quasi-RMS voltage to a digital signal. This digital signal is input to a micro-controller 250, which implements the above described steps of the variable duration method in software. The output of the micro-controller is a square wave signal input to a half-bridge driver 260 which provides the switching signals DRS1, DRS2 to the half-bridge switches Q1, Q2. The A/D converter may be an Analog Devices ADC0820, the micro-controller a Philips 40 MHZ 87C750, and the half bridge driver an IR 2111 from International Rectifier.

Figure 10:
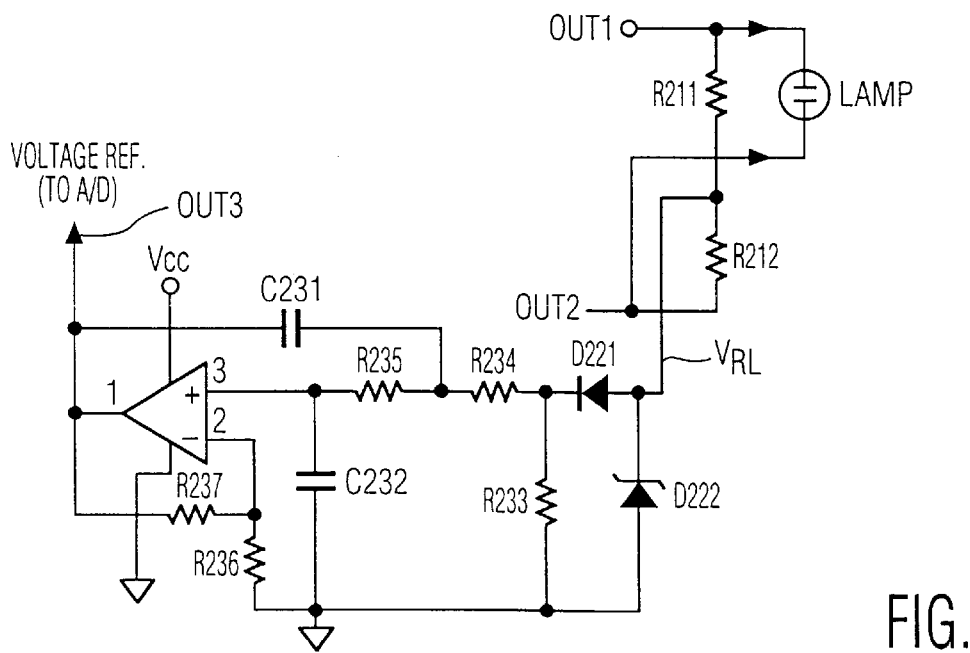
FIG. 10 is a circuit diagram for sensing the voltage and converting it to a quasi-RMS voltage by reducing he voltage amplitude, rectifying and filtering.

FIG. 10 shows a circuit for carrying out the functions of block 200. The lamp voltage is sensed at the ballast output terminals OUT1, OUT2 and reduced in magnitude by a voltage divider including the resistors R211, R212. This reduced lamp voltage $V_{RL}$ is then rectified with diodes D221. The diode D222 is a zener diode for protecting against transients. The filter 230 shown in this implementation is a second order low pass Chebyshev filter. The filter includes op amp OA1 having its inverting input connected to ground through resistor R236 and its non-inverting input connected to the cathode of diode D221 through the resistors R233, R234. The resistor R233 provides further attenuation of the amplitude of the sensed lamp voltages and is connected between ground and a node between the diode D221 and the resistor R234. The capacitor C232 is connected between ground and a node between the resistor R235 and the non-inverting input of the op amp OA1. The output OUT3 of filter 126 is connected to the output of op amp OA1 and one end of the capacitor C231, the other end of which is connected to a node between the resistors R233 and R234. A selected cutoff frequency for the Chebyshev filter is implemented in a well known manner by selection of the values for the resistors R236, R237, R234, R235 and capacitor C231 and C232. This ripple component will propagate through the ignitor (such as an LCC network) and appear across the lamp terminals and modulate the high frequency envelope of the lamp voltage and current.

A commercial ballast operating off of a standard utility line will be implemented using a preconditioner, that is, a power factor correction circuit. In practice, this means that the DC voltage supplied to the bridge ($V_{bus}$) will have a substantial 120 Hz (for Europe 100 Hz) ripple component. This ripple component will propagate through the ignitor (such as the LCC network) and appears across the lamp terminals. The quasi RMS voltage will be effected by this ripple as the cut-off frequency is much higher than 120 Hz.

Figure 8:
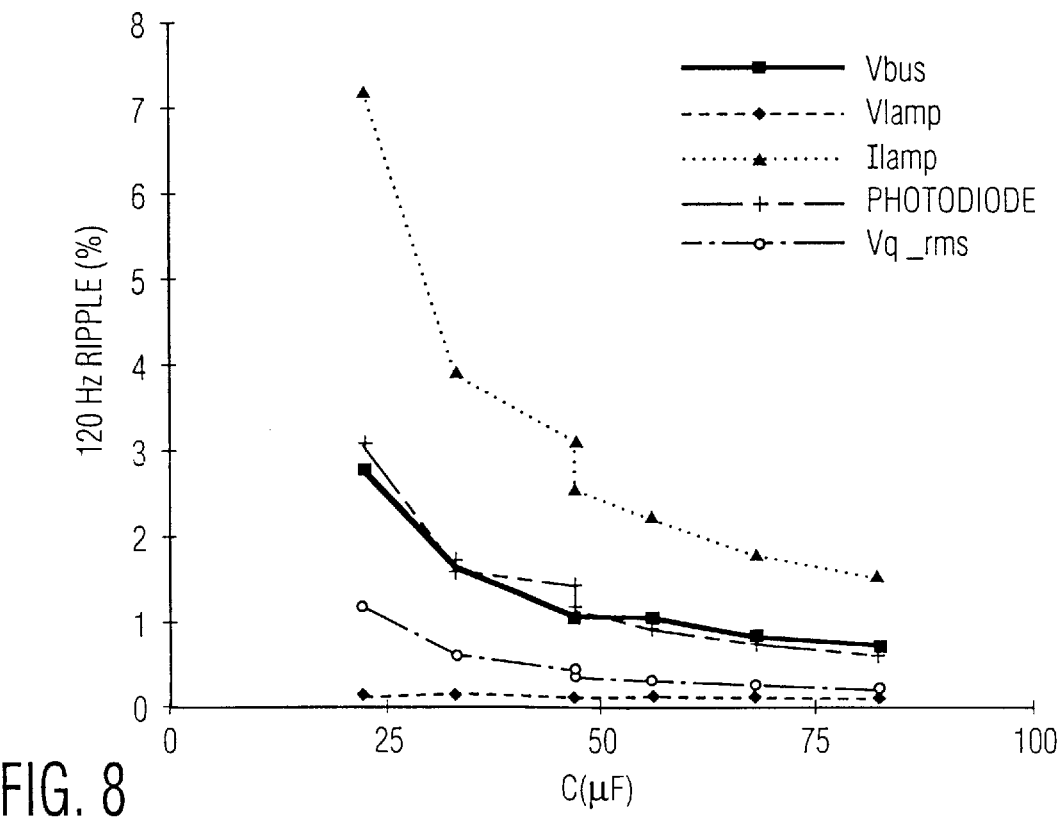
FIG. 8 is a graph showing the affect of the 120 Hz ripple component on various electrical lamp parameters.

The consequences of the ripple component on lamp voltage and current are different. In FIG. 8 the thick line represents the bus voltage and shows the ripple component decreasing with increased storage capacitance. The lamp intensity (the dotted-dashed line behind the thick line) follows this ripple closely. FIG. 8 also clearly shows that, even at low values of the storage capacitance "C", the lamp is capable of maintaining constant voltage, whereas the lamp current has a very large ripple. This is in agreement with the voltage source characteristic of a HID lamp and has a very important consequence. The relatively large current ripple makes it more favorable to use the quasi-RMS voltage than the conductivity as the important signal to determine arc stability, thereby avoiding the effects of current ripple which would be present in the conductivity.

The amplitude of this ripple component is strongly determined by the value of the storage capacitor of the preconditioner. The algorithm should not confuse a change caused by this ripple with a lamp instability. Consequently, a large storage capacitor should be selected to attenuate the ripple. The best performance is obtained when the ripple is below the resolution of the A/D converter 240. Since price and size of the storage capacitor go up with its capacitance value, there is a trade-off between selecting a large storage capacitor for optimum performance versus size and cost of the ballast. The abovedisclosed algorithm deals with a ripple by increasing the value of Σ. This means it will be less sensitive to arc motion. However, it was found that using 47 μF capacitance and quasi RMS voltage did not yield any failures in the variable-duration method, as may have been evidenced by lamp extinguishment or fracture, even using very old lamps over long periods.

Concluding Remarks

The maximum time spent at a frequency which excites a resonance is crucial to avoid damaging the arc tube. The maximum time allowed is about 80–100 ms. Thus, it should be evident that faster microprocessors can react faster, so that the value for the first target value Σ can be increased with increased processing speed, without exceeding the safe time at a frequency associated with an unstable arc. This in turn means that the values for stability factor (m) will be larger, which has two beneficial consequences. One is that the selectivity becomes better as m is an integer (e.g. 6 and 6 are the same, but 11 and 12 are different). The second advantage is that a changing or adaptive value for Σ will no longer be needed in the algorithm, because even for unstable events or lamps, the stability factors $m_i$, will not fall to such low numbers that selectivity disappears.

The algorithm and controller discussed above gives a solution to the problem of strong resonances within the relatively broad and flat region of generally stable operation for HID lamps having ceramic arc tubes. The algorithm was also found to provide flicker free operation for HID lamps having arc tubes of quartz glass, which typically do not exhibit such a wide stable frequency window.

The algorithm is relatively simple and can cope with different lamp operating conditions without having to be changed. This implies no subroutines and easy implementation in an inexpensive microprocessor.

Due to the limited number of operating frequencies necessary to obtain stable operation, the amount of memory needed is much less than with other scanning type algorithms.

The algorithm is self-adapting and applicable to a wide range of HID lamps.

While there have been shown what are considered to be thee. preferred embodiments of the invention, those of ordinary skill in the art will appreciate that various modifications may be made in the above described method and lamp controller which are within the scope of the appended claims. Accordingly, the specification is illustrative only and not limiting.

What is claimed is:

1. A method of operating a high pressure gas discharge lamp to avoid arc instabilities, said method comprising the steps of:
   a) operating the gas discharge lamp at a plurality of operating frequencies;
   b) determining a stability factor for each operating frequency by
      (i) recurrently acquiring a plurality of samples of an electrical lamp parameter at a respective operating frequency and calculating a deviation of said samples,
      (ii) summing said calculated deviations after each step (i),
      (iii) counting the number of iterations of said step (i) until the sum of deviations exceeds a first target value, and assigning the stability factor a value equal to said number of iterations; and
   c) selecting a subsequent operating frequency from the plurality of operating frequencies based on a preselected criteria for the stability factor.

2. A method according to claim 1, wherein said preselected criteria is the stability factor having the highest value.

3. A method according to claim 1, further comprising the step of increasing the value of a stability factor of a respective operating frequency when the stability factor reaches a selected minimum value.

4. A method according to claim 3, wherein said step of increasing increases the stability factor to a value less than a selected maximum value.

5. A method according to claim 1, further comprising the step of modifying the first target value, to which the sum of the deviations is compared, in dependence on the phase of operation of the discharge lamp.

6. A method according to claim 5, wherein the gas discharge lamp has a run-up phase and a steady-state phase, and said step of modifying further comprises decreasing the value of said first target value in a gradual manner when the lamp transitions from the run-up phase to the steady-state phase.

7. A method according to claim 5, wherein during lamp operation said first target value is changed adaptively by comparing the current stability factor with a second target value, and if the stability factor is less than the second target value increasing the value of the first target value and if the stability factor is greater than the second target value decreasing the value of the first target value.

8. A method according to claim 7, wherein the first target value is limited to a maximum value.

9. A method according to claim 7, wherein said first target value is increased or decreased toward the second target value, respectively, by adding or subtracting an integer value.

10. A method according to claim 5, further comprising the step of calculating an average value of the stability factors and, if said average value falls below a preselected level, increasing the value of the stability factor for each frequency by a predetermined amount.

11. A method according to claim 5, further comprising maintaining a preselected minimum difference between the highest value and the next highest value for the stability factors.

12. A method according to claim 10, wherein said step of maintaining comprises the steps of measuring the difference between the highest and the next highest value of the stability factors, adjusting the next highest stability factor value by a constant sum so as to have a predetermined difference with the highest stability factor, and adjusting at least one other stability factor by the constant sum.

13. A method according to claim 1, wherein said sampled lamp parameter is the lamp conductivity.

14. A method according to claim 1, wherein said sampled lamp parameter is the lamp voltage.

15. A method according to claim 14, wherein said lamp voltage is sampled by using the switching signals for driving a switch of an inverter circuit driving the lamp.

16. A method according to claim 1, wherein said sampled lamp parameter is the quasi RMS voltage.

17. A method according to claim 1, wherein said deviation is the standard deviation.

18. A method according to claim 1, wherein said deviation is the maximum deviation calculated by subtracting the smallest deviation from the largest deviation calculated during said step of sensing and determining the deviation of said samples.

19. A method according to claim 18, wherein said maximum deviation calculated during a current operating frequency is calculated using at least some of the deviations from the next previous operating frequency.

20. A method of operating a high pressure gas discharge lamp to avoid arc instabilities, said method comprising the steps of:
   a) selecting a set of a plurality of operating frequencies at which to drive the gas discharge lamp;
   b) assigning an initial stability factor to each of said plurality of operating frequencies, at least one of said frequencies having a stability factor higher than stability factors of the other operating frequencies; and
   c) recurrently (i) operating the lamp at an operating frequency currently having the highest stability factor and (ii) updating the value of the stability factor for the current operating frequency,
   said updating step comprising
      (1) sensing and taking a predetermined plurality of samples of an electrical lamp parameter at said frequency having the highest stability factor and calculating a deviation of this lamp parameter from said plurality of samples;
      (2) summing said deviations until the sum of said deviations equals or exceeds a first target value; and
      (3) counting the number of iterations n, of said step of parameter sensing and calculating the deviation, until said sum of the deviations equals or exceeds said first target value; and
      (4) replacing the current value of the stability factor for the current operating frequency with said number of iterations n.

21. A lamp controller for a high pressure gas discharge lamp, said lamp controller comprising:
   a) ballasting means for operating the gas discharge lamp at a plurality of operating frequencies;
   b) means for determining a stability factor for each operating frequency including by
      (i) recurrently acquiring a plurality of samples of an electrical lamp parameter at a respective operating frequency and calculating a deviation of said samples,
      (ii) summing said calculated deviations after each step (i),
      (iii) counting the number of iterations of said step (i) until the sum of deviations exceeds a first target value, and assigning the stability factor a value equal to said number of iterations; and c) means for selecting a subsequent operating frequency from the plurality of operating frequencies based on a preselected criteria for the stability factor.

22. A lamp controller according to claim 21, wherein said preselected criteria is the stability factor having the highest value.

23. A lamp controller according to claim 21, wherein said control means further includes means for increasing the value of the stability factor of a respective operating frequency when the stability factor reaches a selected minimum value.

24. A lamp controller according to claim 23, wherein said means for increasing increases the stability factor to a value less than a selected maximum value.

25. A lamp controller according to claim 21, wherein said control means modifies said first target value, to which the sum of the deviations is compared, in dependence on the phase of operation of the discharge lamp.

26. A lamp controller according to claim 25, wherein the gas discharge lamp has a run-up phase and a steady-state phase, and said control means decreases the value of said first target value in a gradual manner when the lamp transitions from the run-up phase to the steady-state phase.

27. A lamp controller according to claim 26, wherein during lamp operation said control means changes said first target value adaptively by comparing the current stability factor with a second target value, and if the stability factor is less than the second target value increases the value of the first target value and if the stability factor is greater than the second target value decreases the value of the first target value.

28. A lamp controller according to claim 27, wherein the first target value is limited to a maximum value.

29. A lamp controller according to claim 27, wherein said control means increases or decreases target value toward the second target value, respectively, by adding or subtracting an integer value.

30. A lamp controller according to claim 25, wherein said control means calculates an average value of the stability factors and, if said average value falls below a preselected level, increases the value of the stability factor for each frequency by a predetermined amount.

31. A lamp controller according to claim 25, wherein said control means maintains a preselected minimum difference between the highest value and the next highest value for the stability factors.

32. A lamp controller according to claim 31, wherein said control means determines the difference between the highest and the next highest value of the stability factors, adjusts the next highest stability factor value by a constant sum so as to have a predetermined difference with the highest stability factor, and adjusts at least one other stability factor by the constant sum.

33. A lamp controller according to claim 21, wherein said lamp parameter sampled by said control means is the lamp conductivity.

34. A lamp controller according to claim 21, wherein said lamp parameter sampled by said control means is the lamp voltage.

35. A lamp controller according to claim 21, wherein said lamp voltage is sampled by using the switching signals for driving a switch of an inverter circuit driving the lamp.

36. A lamp controller according to claim 21, wherein said sampled lamp parameter is the quasi RMS voltage.

37. A lamp controller according to claim 21, wherein said deviation calculated by said control means is the standard deviation.

38. A lamp controller according to claim 21, wherein said deviation calculated by said control means is the maximum deviation calculated by subtracting the smallest deviation from the largest deviation calculated during said step of sensing and determining the deviation for an operating frequency.

39. A lamp controller according to claim 38, wherein said maximum deviation calculated by said control means during a current operating frequency is calculated using at least some of the deviations from the next previous operating frequency.

40. A lamp controller for operating a high pressure gas discharge lamp, said controller comprising:

ballasting means for operating the gas discharge lamp over a range of operating frequencies; and control means for controlling the operating frequency of said ballasting means, said control means comprising
first means for storing a set of a plurality of operating frequencies at which to drive the gas discharge lamp and a set of a plurality of stability factors each corresponding to a respective one of said operating frequencies; and second means for recurrently (i) operating the lamp at the operating frequency having the highest stability factor and (ii) updating the value of the stability factor for the current operating frequency, said second means comprising (1) means for sensing and taking a predetermined plurality of samples of an electrical lamp parameter at said frequency having the highest stability factor and calculating a deviation of this lamp parameter from said plurality of samples, (2) means for summing said deviations until the sum of said deviations equals or exceeds a first target value, (3) means counting the number of iterations n that said lamp parameter is sensed and the deviation is calculated, until said sum of the deviations equals or exceeds said first target value; and (4) means for replacing the current value of the stability factor $m_i$ for the current operating frequency $f_i$ with said number of iterations n.

41. A method of operating a gas discharge lamp, comprising the steps of:

operating the lamp at plurality of frequencies;

recurrently sensing an electrical lamp parameter and determining a deviation in the sensed parameter to detect movement in the discharge arc of the discharge lamp, while operating at each of said plurality of frequencies;

determining a stability factor for each operating frequency corresponding inversely to the deviation in the sensed electrical parameter; and operating the gas discharge lamp more at the ones of said plurality of frequencies having higher stability factors than at frequencies having lower stability factors.

* * * * *